United States Patent [19]

Reinhardt et al.

[11] Patent Number: 4,523,278

[45] Date of Patent: Jun. 11, 1985

[54] METHOD OF AUTOMATIC DETECTION OF CELLS AND DETERMINATION OF CELL FEATURES FROM CYTOLOGICAL SMEAR PREPARATIONS

[75] Inventors: Erich Reinhardt; Rainer Erhardt, both of Stuttgart, Fed. Rep. of Germany

[73] Assignee: Prof. Dr.-Ing. Werner H. Bloss, Fed. Rep. of Germany

[21] Appl. No.: 618,447

[22] Filed: Jun. 7, 1984

Related U.S. Application Data

[63] Continuation of Ser. No. 392,590, Jun. 28, 1982, abandoned, which is a continuation of Ser. No. 117,515, Feb. 1, 1980, abandoned.

[30] Foreign Application Priority Data

Feb. 1, 1979 [DE] Fed. Rep. of Germany ....... 2903855

[51] Int. Cl.³ ............................................. G06F 15/42
[52] U.S. Cl. .................................... 364/413; 364/415; 382/6
[58] Field of Search ............... 364/413, 415, 416, 497, 364/499, 527, 572; 358/93, 106, 107; 382/6, 16, 22; 377/6, 10, 11

[56] References Cited

U.S. PATENT DOCUMENTS

| 4,097,845 | 6/1978 | Bacus | 340/146.3 CA |
| 4,122,518 | 10/1978 | Castleman et al. | 364/415 |
| 4,199,748 | 4/1980 | Bacus | 364/515 |
| 4,207,554 | 6/1980 | Resnick et al. | 340/146.3 CA |
| 4,210,419 | 7/1980 | Castleman | 364/413 |
| 4,213,036 | 7/1980 | Kopp et al. | 340/146.3 CA |

OTHER PUBLICATIONS

Imasato et al., "Cybest TM-Automated PAP Smear Prescreener", Toshiba Review-No. 100, Nov.-Dec. 1975, pp. 60-63.

Primary Examiner—Jerry Smith
Assistant Examiner—Gary V. Harkcom
Attorney, Agent, or Firm—Barnes & Thornburg

[57] ABSTRACT

A method and system for automatic detection of cells and determination of cell features from cytological smear preparations which can recognize cells and extract their features independently of known visual cell descriptions through digital classification in a data processing system confines evaluation of the cell to the cell nuclei.

17 Claims, 1 Drawing Figure

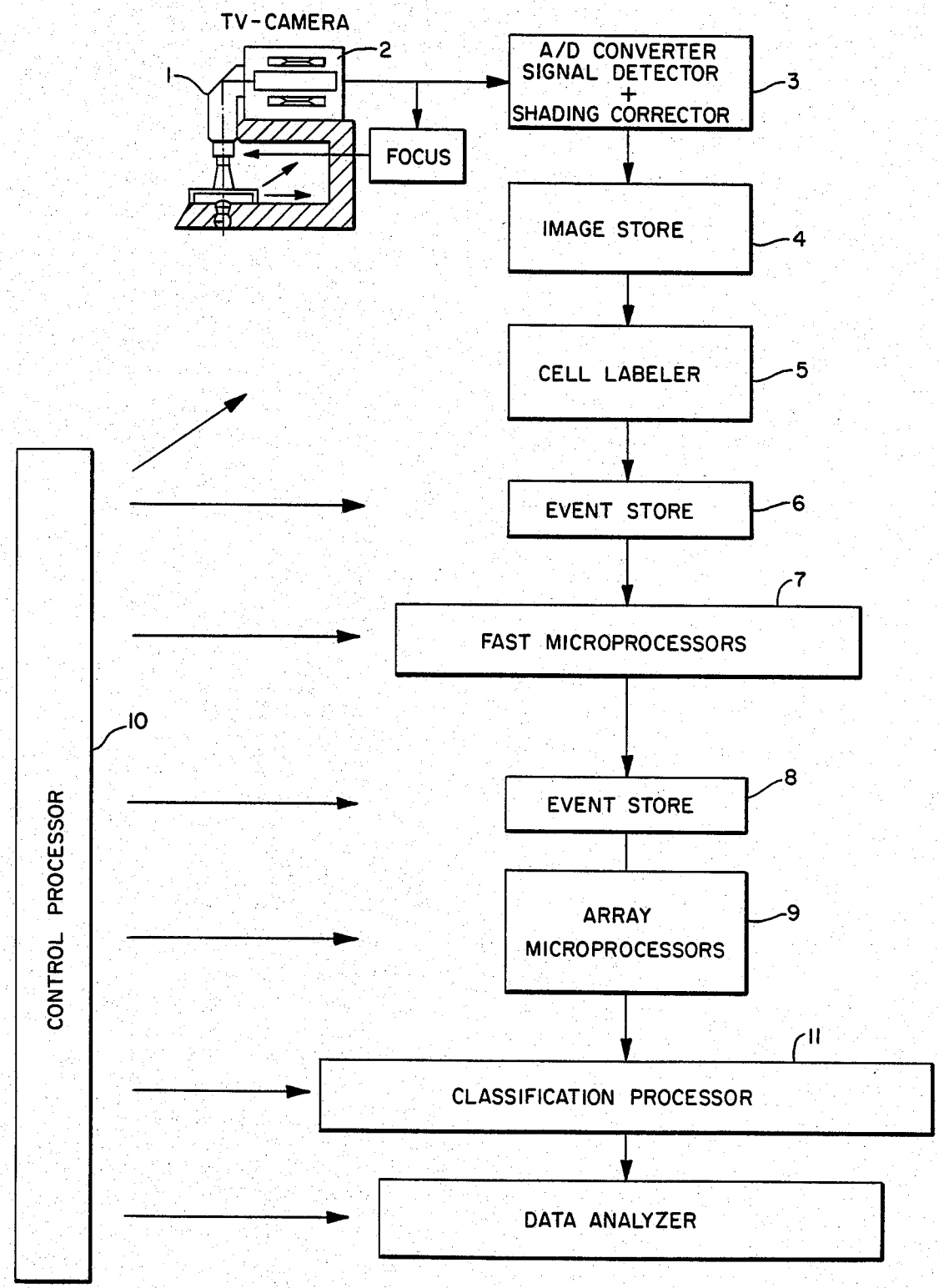

METHOD OF AUTOMATIC DETECTION OF CELLS AND DETERMINATION OF CELL FEATURES FROM CYTOLOGICAL SMEAR PREPARATIONS

This is a continuation of application Ser. No. 392,590, filed June 28, 1982, which is a continuation of Ser. No. 117,515, filed Feb. 1, 1980, both now abandoned.

The invention relates to a method of automatic detection of cells and determination of cell features from cytological smear preparations, which are displayed in the form of television images generated by a television camera mounted on a microscope.

Cytoanalysis, used primarily for early detection of cervical cancer, is presently preferred primarily by visual classification carried out by specially trained individuals, especially cytopathologist. Classification performance is largely dependent upon the experience of the evaluating individual, who frequently assigns an individual cell to a specific class on the basis of intuition and experience.

Automatic devices for cytoanalysis have also been developed which attempt to convert visible features, known from visual cell description, into algorithms; however, it is not a simple matter to describe the intuitive parameters of an individual evaluating the cells and to convert them to algorithms. Moreover, it is difficult to evaluate these visual features in a data-processing system, since they are not readily adapted to digital analysis.

One example of an automatic system for cytoanalysis has been described in "Analytical and Quantitative Cytology," second issue, page 143, 1979.

The object of the present invention is to provide a method of the type described hereinabove, which can recognize cells and extract their features independently of the known visual cell description, said method being especially suitable for digital classification in a data processing or computer system. This goal is achieved by virtue of the fact that only the cell nuclei are used for evaluation.

In accordance with this invention, television images of the cell are stored in at least one digital memory and mathematical operations, known as "local operators", are performed locally on the digital representation of each image point, based on the value of neighboring points, in order to filter out all structures below a predetermined size, whereby the stored signals relating to the cell nuclei are smoothed and simultaneously localized as image segments by a transformation of the filtered images. The localized image segments are then subjected to a boundary-finding process, and the cell nuclei found by the boundary-finding process are subjected to a determination of specific features by measurements on the original image and the transformed images and/or on logical or arithmetic relationships between the transformed images.

The method according to the present invention permits cell detection and determination of cell features, and is especially suited for use with high-speed parallel data processors. It has been found that only nuclear analysis is sufficient for classification of cells. In this regard, limitation to nuclei analysis has definite advantages. In the first place, only the cell nuclei need be localized, simplifying cell detection. The cell density in the preparation under study can be greater, since the plasmas can overlap. The section of the preparation under study is smaller for the same number of cells, since there are no problems with overlapping plasmas. The processing time for cell detection, boundary determination, and feature determination are much shorter. In addition, evaluation is independent of the anticipated staining of the preparations.

In accordance with the invention, local operators are provided for dilation of the images and the inverted images to filter the TV images. Two-dimensional filter operations are carried out which suppress spurious structures and smaller nuclei (for example those of lymphocytes, etc.) in advance, without a threshold value being set. Moreover, nuclei which are in contact with one another can be split again into two separate areas prior to nuclear detection.

In accordance with another feature of the invention, threshold value processes to determine relative gray value peaks are carried out to localize the cell nuclei through a masking process. This results in a detection of the cell nuclei in the filtered image by maximum detection with neighborhood analysis and data suppression below a predetermined threshold value. In this manner, nuclear structures within a nucleus produce only a single indication and plasma areas produce no indication at all.

In accordance with another feature of the invention, coarse segmentation of the nuclear areas is performed first by means of a line-wise and column-wise integration of the gray values of the images as a boundary-finding process, in which images a classification is performed to determine the cell boundaries, wherein all of the points in the images are assigned to two disjunctive classes. From these values, a two- or multi-dimensional histogram is generated, depending on the number of integration directions. In this histogram, the image components "nucleus," "plasma," and "background" are separated from one another by relative minima.

When the gray values corresponding to the relative minima in the histogram are converted back into gray value integral functions, the result is a coarse position determination for the three relevant image components, which can then be separated from one another by straight lines.

Further processing is then limited to the nuclear area thus coarsely delimited, which, in order to be certain that the entire nuclear information is contained therein, is magnified several image points in one integration direction. Coarse insertion permits further data reduction, permitting one to ignore which are definitely not cell nuclei. At this stage, if desired, it is possible to introduce the ratio of nuclear sizes to plasma sizes, which is known normally for the cells to be investigated, in order to eliminate additional events which are not cells. The nuclei are then labeled precisely be classification. A classification method is used for nuclear boundary determination in which the image can be processed line by line.

During classification, an attempt is made to assign all of the points in the image in succession to two disjunctive classes, namely:

(1) $\Omega_1$: Amount of all nuclear boundary points.
(2) $\Omega_2$: Amount of all points which are not boundary points.

In the above, $\Omega_1$ is further broken down into four subgroups which are disjunctive in pairs, whereby the left and right as well as upper and lower boundary points are assigned to different sub-groups.

For the purposes of reliable clssification, each image point is described sufficiently by an 8-dimensional feature vector. The features relevant for the classification process are the first and second partial derivatives of the gray values on the x and y axes, the difference between the averaged right- and left-side as well as the upper and lower gray values, the probability of encountering a nuclear boundary point at the locus of the actual image point, and the probability of encountering a nuclear point with the gray value of the actual image point. From these features, a measure of the probability of membership in a specific class is determined for each image point.

In order to be able to determine the gradient features reliably, the image is subjected to median filtering before feature determination. Advantageously, the method initially requires an image point within the cell nucleus which absolutely must be present during cell detection and segmentation.

For feature extraction, in accordance with another aspect of the invention, it is advantageous for the gray value area to be measured and determined prior to determination of the features of the cell nuclei, in which area the information is modulated. This can be accomplished for example by using the curve of the circumferential function of the entire gray value area.

In accordance with another feature, within the predetermined gray value area, the area, circumference, and Euler number can be measured in the original image and the transformed images and/or in the logical or arithmetic links between the transformed images. The feature vectors thus measured are composed of three linearly independent Minkowski parameters: area, circumference, and Euler number, as well as their non-linear combinations.

Further features and advantages of the invention will follow from the description given hereinbelow of a method which is performed by the device shown in the accompanying drawing which is a block diagram of an exemplary embodiment of this invention.

The visual field of the preparation to be analyzed is imaged by the objective of a microscope 1 on the photosensitive layer of a television camera 2 and is scanned therein line by line. The signals derived from the camera 2 are converted into a succession of digital values by an anaolg-to-digital converter 3 in such a manner that the field is broken down into 288×512 image points with each being valued in accordance with a scale of 256 gray steps. The image point interval is 0.5 micron. The television measurement camera used should provide a very small geometric error, a linear transmission characteristic, a high signal/noise ratio, and good stability. Signal non-homogeneities caused by irregular sensitivities in the photosensitive layer and the microscope illumination are compensated on-line by a digital shading corrector provided in the converter 3. The compensated image data is then stored directly in an 8-bit image point (288×512) digital image memory 4 for further analysis.

In cell labeler 5, an array processor initially carries out image transformation (masking with a radius $r_o$ where $r_o$ is the radius of the largest structures to be suppressed) by two-dimensional locally delimited coupling fields. The transformed image is stored again in memory. In a second step performed by cell labeler 5, detection of relative gray value peaks in sub-fields of a predetermined size is carried out in the transformed image. For this purpose, threshold value images are generated from the transformed image in succession, said threshold value images being produced by going through the threshold values from the high to the lower gray values. The coordinates of the image points which are above the preset threshold value are then determined in a logic circuit. When the first threshold value image is scanned line-by-line, the coordinates of the first detected points are stored and surrounded by a frame or mask of a predetermined size. Additional detected points are then stored only if they are located outside the predetermined frame. All of the stored labels are surrounded with such a frame. In evaluating subsequent threshold value images, new labels are stored only if they are not located inside frames already found. The last threshold value image to be evaluated is generated by a threshold value which corresponds to the average gray value of the cytoplasm.

The labels are located inside cell nuclei with high probability, their coordinates are always more than half the edge length of the predetermined frame part, and they label the phenomena of interest in the stored original image. Furthermore, only that information from this image is processed which is located inside the detected frames. Finally, the image areas thus defined are stored in digital event memories 6.

This series of steps is followed by the two-stage segmentation of each cell image stored in the event memories 6. Processing is carried out with the method described above using fast microprocessors 7. First of all, the coarse limits of the cell nuclei and cytoplasm are determined, and the image areas to be evaluated are reduced in this fashion. In these reduced image areas, the exact limits of the cell nucleus and the cytoplasm can be calculated by suitable microprograms. The isolated cell nuclei are then subjected to feature determination in sequence after storage in the next event memory 8.

The various image transformations for feature determination can be carried out very rapidly in parallel by special array processors 9. The original image, and logical or arithmetic transformations of the image, are transformed by local erosion or dilation operators. Both the original nucleus image and the transformed nuclear images are stored in digital memories associated with the control processor 10. The information in the n stored nuclear images is fed to the measuring logic through a threshold value process with an adjustable threshold, and this measuring logic then measures the features such as "area," "circumference," and "Euler number," by logical links and counting operations in the threshold value image. There are m thresholds in sequence which are produced by the control processor 10 in the gray value area previously calculated for each nucleus. This then produces the three features of a cell nucleus for the established m discrete gray values (threshold values) and therefore 3×n m features. Non-linear linking of feature functions can increase the number of features still further. The totality of features in a cell nucleus constitutes its feature vector, which is then fed to the classification processor 11 for determination of the individual events.

This is followed by segmentation, nuclear boundary calculation, transformation and feature calculation of the next labeled event. When all of the labeled events in a visual field have been processed, a stepping motor advances the preparation one visual field. Camera 2 is prepared to receive the new image field by rapid extinction of the decaying information in the previous image field. Stroboscopic illumination of the preparation under examination permits the information in the new image field to be stored after 120 ms.

The systematically developed and processor-oriented algorithms for labeling and segmentation of cells in the visual field, as well as feature detection from the segmented cell nuclei and their classification permits analyzing visual fields with special parallel processors, employing the latest semiconductor technology within a period of 120 ms stepwise (on-line). In this way, up to 8 events per visual field can be detected. The entire processing procedure is synchronized by the control processor 10.

One possibility of calculating the features will now be described using the example of feature determination of an already detected and segmented cell nucleus.

First of all, the circumference of the non-transformed cell image is determined on the basis of the 256 gray values, which produces the circumference as a function of the 256 discrete gray values (circumferential function). From this circumferential function, the relevant gray value area is determined for further measurements in such a fashion that it is not constant within this area. Therefore, within this area, the gray tone information of the cell nucleus is modulated. The gray value area thus determined is subdivided into 20 equidistant intervals which are used as threshold values for measuring the features from the nuclear image. Then the nuclear image is subjected to the following image transformations:

Erosion with radius $r=1$
Erosion with radius $r=2$
Dilation with radius $r=1$
Dilation with radius $r=2$
(Dilation with radius $r=1$)−(Erosion with radius $r=1$)
(Dilation with radius $r=3$)−(Erosion with radius $r=3$)

images. In these images, the following three basic features are then determined for each of the 20 previously determined gray values:
(a) "area"
(b) "circumference"
(c) "connectivity"

In addition, the following combinations of these basic features are calculated for each of the 20 gray values.

1. "Quotient of connectivity (30) and area"
(Connectivity (+) is the positive part of connectivity)
2. "Quotient of connectivity (−) and area"
(Connectivity (−) is the negative part of connectivity)
3. Quotient of the square of the circumference and the area"

This produces 6 different feature functions with 20 values each. Not all of the feature functions are determined in each of the transformed images, but instead they are selected as shown in Table 1.

TABLE 1

| Example of feature calculation of a cell nucleus | |
|---|---|
| Feature function (20 discrete values each) | Image in which it is measured |
| 1 Area | Original image |
| 2 Circumference | Original image |
| 3 Connectivity(+) area | Original image |
| 4 Connectivity(−) area | Original image |
| 5 Circumference | Erosion with radius $r=1$ |
| 6 Connectivity | Erosion with radius $r=1$ |

TABLE 1-continued

| Example of feature calculation of a cell nucleus | |
|---|---|
| Feature function (20 discrete values each) | Image in which it is measured |
| 7 (Circumference)$^2$/area | Erosion with radius $r=1$ |
| 8 Circumference | Erosion with radius $r=2$ |
| 9 Connectivity | Erosion with radius $r=2$ |
| 10 (Circumference)$^2$/area | Erosion with radius $r=2$ |
| 11 Circumference | Dilation with radius $r=1$ |
| 12 Connectivity | Dilation with radius $r=1$ |
| 13 Circumference | Dilation with radius $r=2$ |
| 14 Connectivity | Dilation with radius $r=2$ |
| 15 Circumference | (Dilation with $r=1$) − (Erosion with $r=1$) |
| 16 Connectivity | (Dilation with $r=1$) − (Erosion with $r=1$) |
| 17 Circumference | (Dilation with $r=3$) − (Erosion with $r=3$) |
| 18 Connectivity | (Dilation with $r=3$) − (Erosion with $r=3$) |

This selection of feature functions is accomplished for example by analyzing the feature space and by classification experiments with a representative number of cells. The feature functions are selected in such a fashion that they extract the largest possible amount of information from the images to differentiate different cell classes from one another.

The result is a set of $18 \times 20 = 360$ features described by 360 numbers. The feature set thus obtained for each cell is further standardized. It constitutes the data-reduced description of the cell which is suitable for automatic classification.

We claim:

1. A method for automatic classification of cells and determination of cell features from cytological smear preparations, on the basis of an original television image displaying a plurality of cell nuclear images, obtained by means of a television camera, wherein only the cell nuclei are used for evaluation, while irrelevant structures displayed in said original image are ignored, and wherein said classification and determination is based on a feature set consisting of topological parameters of the boundaries of said nuclei as displayed both in the original image and in one or more transformed images, the steps comprising
(a) storing the original television images in memory as an array of image point gray scale values;
(b) filtering the original images to suppress the scale values representing irrelevant structures, including structures beneath a predetermined size, thus obtaining filtered and transformed images;
(c) establishing threshold values of the filtered images to determine relative gray value peaks thereby smoothing and simultaneously localizing cell nuclei as individual nuclear images;
(d) determining the image points corresponding to the boundary of a nucleus as displayed in said nuclear image;
(e) measuring one or more topological parameters of the boundary of said nucleus, as displayed in said original and transformed images, to obtain a set of features of said nucleus;
(f) classifying said nucleus on the basis of said features set; and
(g) repeating steps (c) through (f) for each individual nuclear image in said filtered image.

2. The method according to claim 1, wherein the step of suppressing scale values representing irrelevant structures in the stored images is effected by local gray value operators which effect dilation in the images and inverted images to filter the stored television images.

3. The method according to claim 1, wherein prior to storing the television images said images are converted to digital form, the converted images being then stored in at least one digital memory.

4. The method according to claim 1 wherein the threshold values are limited to image areas located within a predetermined distance from a point of an image.

5. The method according to claim 1, wherein the boundary determination process includes a coarse limitation of the nuclear area being performed initially as a boundary finding process by integrating the gray values of the images by lines and columns, whereupon classification is carried out to determine the nuclear boundaries, wherein all of the points in an image are assigned to two disjunctive classes.

6. The method according to claim 1, further comprising the steps of measuring an area of gray values prior to determination of the features of the cell nuclei.

7. The method according to claim 6, wherein the step of feature determination includes measuring, within the predetermined gray value area, the area, circumference, and Euler number in the original image and the transformed images.

8. The method according to claim 7, wherein the transformation of the images is carried out by local erosion and dilation operators which evaluate the neighborhood relationships.

9. A system for automatic detection of cells and determination of cell features from cytological smear preparations comprising:
    means for generating signals representing images of said cell features including a television camera mounted on a microscope;
    memory means for storing said image signals;
    means for filtering said storage image signals to suppress stored image signals representing structures beneath a predetermined size;
    means for effecting transformation of said filtered signals to smooth and simultaneously localize the cell nuclei as individual nuclear images;
    means responsive to said transformed signals for detecting the boundaries of the individual nuclear images;
    means for eroding and dilating the individual nuclear images to obtain transformed nuclear images; and
    processor means for detecting selected features in the cell nuclei of the individual and transformed nuclear images by measuring one or more topological parameters of said individual and transformed nuclear images.

10. A system as defined in claim 9, further comprising converter means for converting said signals from said generating means to digital form, and wherein said memory means includes an image point digital image memory.

11. A system as defined in claim 9, wherein said transformation means includes means for determining the relative gray value peaks in sub-fields of a predetermined size in said stored images represented by said filtered signals.

12. A system as defined in claim 11, wherein said detecting means includes means for producing a succession of threshold value images from said filtered signals, each corresponding to one of the range of gray values as a threshold, means for scanning each threshold value image line-by-line to detect the image points thereof, means for storing the coordinates of the detected points, and means for masking those areas in each threshold value image in which an image point is detected so that in the scanning of subsequent threshold value images only points located outside a masked area will be detected.

13. A method of automatically detecting cells and determining the features of cells from cytological smear preparations, scanned by means of a television camera mounted on a microscope, and subjected to cell detection, coarse delimination, segmentation, and feature measurement following A/D conversion with digital storage, comprising:
    transforming original digital images by calculating the value of each transformed image point from the corresponding point in the original image points lying in a limited range around this point;
    stripping original images of all structures below a predetermined size;
    determining the positions of the cell nuclei by detecting local gray value maxima in these transformed images, and detecting maxima having spacing above a predetermined value;
    generating threshold value images in succession when passing from high to low threshold values to detect local gray value maxima in these transformed images, and determining the coordinates of the image points lying above the corresponding threshold value, by storing the coordinates of the first detected point after scanning the first threshold image line by line, and surrounded with a first frame of a predetermined size, and storing additional detected image points in the same or subsequent threshold value images and surrounded with a frame of their own only if these image points are located outside the previously established frames;
    detecting segments having a high probability of containing cell nuclei by analyzing the coordinates of the detected frame;
    performing a coarse limit finding process of the nuclear areas in the detected image segments by initially integrating the gray values of the image segments by lines and columns, and then determining the position of the nuclear areas from the minima of histograms of the functional values of the line and column integration functions, and determining the exact nuclear limits in these coarsely delimited nuclear areas by describing all image points by a feature vector and classified by assigning all image points to the two disjunctive classes of nuclear points and non-nuclear points; and
    measuring the area, circumference, and Euler number on the original image and one or more transformed images as a function of the gray value to measure the features of the segmented cell nuclei.

14. A method according to claim 13 wherein the range of said gray values is measured and established prior to measurement of the features of the cell nuclei.

15. A method according to claim 13 wherein the coarse delimitation of the cell plasma is determined from the minima of the histograms of the functional values of the line and column integration functions.

16. A method according to claim 13 wherein the area, circumference, and Euler number of the cell nuclei are measured on the original image and logical or arithmetic compositions of the transformed images.

17. A method according to claim 16 wherein the range of said gray values is measured and established prior to measurement of the features of the cell nuclei.

* * * * *